US005665409A

United States Patent [19]

Drewry

[11] Patent Number: 5,665,409

[45] Date of Patent: Sep. 9, 1997

[54] APPARATUS FOR CARRYING HAY BALES

[76] Inventor: Bryan Lance Drewry, 625 Coyne Rd., Imperial, Calif. 92251

[21] Appl. No.: 774,716

[22] Filed: Jan. 3, 1997

Related U.S. Application Data

[63] Continuation of Ser. No. 349,980, Dec. 6, 1994, abandoned.

[51] Int. Cl.[6] .............. A23K 1/00; B66C 1/12

[52] U.S. Cl. .............. 426/132; 294/1.1; 294/74; 294/149; 426/636

[58] Field of Search .............. 294/1.1, 26, 67.1, 294/67.4, 74, 89, 93, 97, 98, 120–130, 137, 149, 153, 158; 16/110 R, 125; 414/24.5, 25, 911; 426/110, 132, 420, 421, 636

[56] References Cited

U.S. PATENT DOCUMENTS

| | | | |
|---|---|---|---|
| 206,797 | 8/1878 | Kamp et al. | 426/636 |
| 414,303 | 11/1889 | Durning | 294/130 |
| 498,391 | 5/1893 | Hawk | 294/126 |
| 691,954 | 1/1902 | Lowry | 426/132 |
| 712,137 | 10/1902 | Jackson . | |
| 923,072 | 5/1909 | Parish | 294/126 |
| 1,187,496 | 6/1916 | Bullock . | |
| 1,480,703 | 1/1924 | Ward | 294/1.1 |
| 1,562,196 | 11/1925 | Abrams | 294/158 |
| 2,488,312 | 11/1949 | Millican et al. | 294/26 |
| 2,583,091 | 1/1952 | Dotterer | 294/26 |
| 3,276,608 | 10/1966 | Pinney | 294/121 X |
| 3,524,543 | 8/1970 | Bundy et al. | 294/74 X |
| 3,545,659 | 12/1970 | Libby | 294/149 X |
| 3,626,508 | 12/1971 | Sharrow | 294/67.1 X |
| 3,930,578 | 1/1976 | Stein | 206/150 |
| 4,022,507 | 5/1977 | Marino | 294/74 |
| 4,262,951 | 4/1981 | Hoyer | 294/89 |
| 4,269,308 | 5/1981 | Platt | 206/150 |
| 4,304,431 | 12/1981 | Walston | 294/89 |
| 4,341,411 | 7/1982 | Edwards | 294/120 X |
| 4,448,451 | 5/1984 | Colson | 294/74 |
| 4,796,939 | 1/1989 | Symonds et al. | 294/67.1 |
| 5,090,177 | 2/1992 | Gombos et al. | 53/399 |
| 5,111,931 | 5/1992 | Gombos et al. | 206/83.5 |
| 5,353,740 | 10/1994 | Pellerin | 414/25 X |

FOREIGN PATENT DOCUMENTS

| | | | |
|---|---|---|---|
| 1513878 | 2/1968 | France | 294/89 |
| 3228817 | 2/1984 | Germany | 294/89 |
| 3828986 | 4/1989 | Germany | 294/1.1 |

*Primary Examiner*—Johnny D. Cherry

*Attorney, Agent, or Firm*—Fish & Richardson P.C.

[57] ABSTRACT

An apparatus for carrying a compressed hay bale. The apparatus comprises a strap surrounding the compressed hay bale and a handle extending from the strap and from an exterior surface of the compressed hay bale. The handle may be secured around the strap or may be integral to the strap. The apparatus may further include additional straps around which the handle is secured, or additional handles may be secured to the additional straps. Alternatively, the apparatus may comprise a handle coupled to a stopper via a coupler. The handle in this alternative embodiment extends from the exterior surface of the compressed hay bale and the coupler is disposed within the interior of the compressed hay bale. The stopper may be disposed within the interior of the compressed hay bale or against another exterior surface of the compressed hay bale that may be opposing the exterior surface from which the handle extends.

26 Claims, 2 Drawing Sheets

APPARATUS FOR CARRYING HAY BALES

This is a continuation of application Ser. No. 08/349,980, filed Dec. 6, 1994, now abandoned.

BACKGROUND OF THE INVENTION

1. Field of the Invention

The present invention relates to apparatus for carrying hay bales. More particularly, the present invention relates to handles for carrying compressed and field hay bales.

2. Description of the Related Art

Hay is needed throughout the United States and the world to feed various livestock. Thus, the hay producing regions of the world transport and ship hay over great distances to other regions in which hay is not plentiful, but in which a need exists to provide hay to livestock.

Hay may be packaged in a variety of styles. For example, hay may be formed into "tightened field bales" that are generally transported only locally or over-land. In forming field bales, the hay is cut in the field and raked into windrows. A bailing machine moves along the windrows, picking windrows up the raked hay and feeding it through a chute in the machine. The chute progressively narrows through the bailing machine, causing the hay to tighten as it moves through the chute. Before being expelled from the end of the chute, the hay is bound with twine. Because field bales are tightened, they have some degree of cohesiveness and do not tend to completely disintegrate when moved over short distances. Nevertheless, field bales are bulky and thus occupy a relatively large amount of space. Accordingly, when transporting and shipping over long distances, particularly overseas, where the bales must be packed into shipping containers and loaded onto ships, it is necessary to further compact the hay bales.

Therefore, tightened field bales are not practical for use in overseas shipping in most applications, and thus the hay is usually formed into "high-density compressed hay bales." In forming high-density compressed hay bales, the hay is removed from the field and taken to a compressing facility, which has heavy-duty machinery, such as hydraulic compactors, that are used to compress the hay into small but heavy bales. The high-density compressed hay bales are bound with polypropylene straps or heavy-duty twine to hold them together. Because they are compressed under great force, high-density compressed hay bales have a much smaller volume than tightened field bales, occupying approximately one-half the volume of field bales with the same or even greater mass. This means high-density compressed hay bales take up far less volume in shipping containers and yet have as much or more hay, by weight, than field bales. The heavy compression and strapping allows high-density compressed hay bales to remain substantially intact when being moved overseas, even after enduring a significant amount of handling during the journey to the final destination.

While both high-density compressed bales and tightened field bales can be transported, it is difficult for a person to manually move or carry such bales. Frequently, when the bales reach their destination, persons, such as farmers, must handle and attempt to carry the bales. Yet, high-density compressed hay bales weigh between 90 and 150 pounds and are large enough that they are unwieldy for persons to handle or carry. Tightened field bales weigh between 75 and 150 pounds and are even larger than high-density compressed hay bales, making them difficult to handle as well.

This manageability problem in both high-density compressed hay bales and tightened field bales is exacerbated by the fact such bales have no expedient means by which to carry them. As noted above, high-density compressed hay bales are held together by straps or lines of heavy-duty twine that tightly surround the bales and help to hold them together. Yet, because the straps so tightly surround the high-density compressed bales, the straps are difficult—indeed, nearly impossible—for a person to grab. The size and weight of the high-density compressed bales, moreover, make it extremely difficult for a person to lift them. Hay hooks also do not work well for carrying and dragging compressed hay bales, because the hay is compressed so tightly that the hooks cannot be adequately imbedded into the bale, thereby preventing the necessary purchase required for hay hooks to work.

Similarly, conventional tightened field bales, which are even larger than high-density compressed hay bales with similar weight, are also equipped with twine straps that help to hold the bales together. Although the straps are not as tightly bound around the bales, they still do not provide an effective means by which to carry the field bales. The straps are orthogonal to the natural direction of the hand of the person carrying the bale, making the straps ergonomically incorrect and thus uncomfortable for carrying the bales. Moreover, although it is feasible for a person to imbed a hay hook into a field bale, because the field bales are not highly compressed, hay hooks are not completely reliable for carrying the hay bale; the hook may rip out of the field bale when it is lifted. In addition, hay hooks are extremely unsafe and hazardous and thus their use should be avoided.

Due to the relatively low-cost of high-density compressed hay bales and tightened field bales, it is critical for the carrying means or handles to be low-cost. If the handles are too expensive, either in material costs or in processing costs, they will be economically infeasible. That is, the costs will outweigh the benefits. Furthermore, because both high-density compressed hay bales and tightened field bales are heavy, the handles must be reliable and securely attached to the bales. If the handles are not reliable and either break or rip out of the bale, they will serve no useful purpose and, in fact, will reduce the value of the bales, as the bales will suffer damage when being carried or pulled by the handles. Finally, the handles must be easy to use.

Therefore, a need exists for an apparatus that facilitates manual (and even mechanized) carrying and handling of high-density compressed hay bales and tightened field bales, an apparatus that is also inexpensive and simple to use.

SUMMARY OF THE INVENTION

Accordingly, the present invention is directed to an apparatus for carrying high-density compressed hay bales and tightened field bales that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the apparatus and method particularly pointed out in the written description and claims hereof, as well as the appended drawings.

To achieve these and other advantages, and in accordance with the purpose of the present invention, as embodied and broadly described herein, the present invention is an apparatus for carrying a compressed hay bale. The apparatus comprises a strap surrounding the compressed hay bale, and a handle secured to the strap, a first portion of the handle being disposed between the compressed hay bale and the strap.

In another aspect, the present invention is an apparatus for carrying a compressed hay bale, the compressed hay bale having an interior region and an exterior surface. The apparatus comprises a handle extending from the exterior surface of the compressed hay bale. The apparatus also comprises a coupler disposed within the interior region of the compressed hay bale, the coupler having a first end and a second end, the first end being attached to the handle. Finally, the apparatus comprises a stopper attached to the second end of the coupler.

In yet another aspect the present invention is an apparatus for carrying a compressed hay bale having an exterior surface. The apparatus comprises a strap surrounding the compressed hay bale, the strap being tightly secured around the compressed hay bale. The apparatus also comprises a handle extending from the strap and from the exterior surface of the compressed hay bale.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification. In addition, the accompanying drawings illustrate the embodiments of the invention and, together with the description, serve to explain the principles of the invention.

DESCRIPTION OF THE PREFERRED EMBODIMENT

Figure 1:
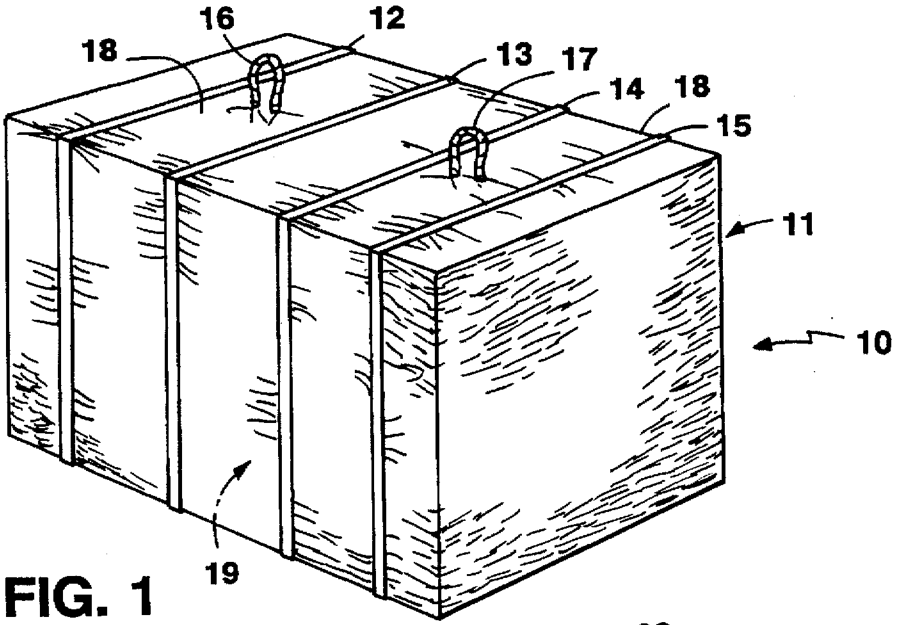
FIG. 1 is a perspective view of a hay bale illustrating a preferred embodiment of the present invention.

Reference will now be made in detail to the present preferred embodiments of the invention, examples of which are illustrated in the accompanying drawings. Wherever possible, the same reference numerals will be used throughout the drawings to refer to the same or like parts.

In accordance with the present invention, an apparatus is provided for carrying or handling a high-density compressed hay bale or a tightened field bale. The apparatus comprises at least one strap surrounding the hay bale. A handle extends from an exterior surface of the hay bale and may be secured around the strap or may be integral to the strap. Alternatively, the apparatus may comprise a handle coupled to a stopper via a coupler. The handle in this alternative embodiment extends from the exterior surface of the hay bale, and the coupler is disposed within the interior of the hay bale. The stopper may be disposed within the interior of the hay bale or against another exterior surface of the hay bale that may be opposing the exterior surface from which the handle extends.

An example of a preferred embodiment of the apparatus of the present invention is illustrated in FIG. 1 and is designated generally by reference numeral 10. As illustrated, this first exemplary embodiment of the apparatus of the present invention comprises a hay bale 11, a plurality of straps 12–15 that surround and maintain the integrity of the hay bale 11, and at least one handle 16, 17 for carrying or handling the hay bale 11.

The hay bale 11 may be either a high-density compressed hay bale used in primarily overseas shipping or a tightened hay bale used in local transportation and some long-distance overland shipping applications. As used herein, "high-density compressed hay bale" or "compressed hay bale" refers to a hay bale that is used in overseas shipping applications because of its relatively small volume. The high-density hay bales are significantly compressed by heavy machinery, making them small, but heavy. Due to the compression, moreover, the high-density compressed hay bales are resistant to disintegration, but, as described above, are also so highly compressed as to resist penetration by a hay hook. As used herein, "tightened field bale" or "field bale" refers to a hay bale that is tightened by a field baling machine and that may be used in short-distance and overland transportation applications. The field bales have a larger volume then and are less resistant to disintegration than compressed hay bales, because field bales are merely tightened by in-field machinery, while compressed bales are highly-compressed by machinery that is generally not located in the field. Because field bales are not heavily compressed like high-density compressed hay bales, they may be penetrated by a hay hook.

The straps 12–15 are tightly secured around the hay bale 11 and help to hold the hay bale 11 together. In high-density compressed hay bales, the straps 12–15 are added during the compression process and are so tightly secured around the compressed hay bales that it is extremely difficult for a person to fit his fingers or hands between the straps 12–15 and the surface 18 of the high-density compressed hay bale. Accordingly, the straps 12–15 on high-density compressed hay bales are not useful for manual carrying and moving of the hay bale. In tightened field bales, on the other hand, the straps 12–15 are not as tightly secured around the hay bale, making it possible for the farmer or other person wishing to carry or pull the bale to use these straps 12–15. Yet, the straps 12–15 on field bales are not comfortable or convenient for use in carrying the bales; rather, the straps 12–15 on field bales are designed merely to maintain the bale 11 in one piece and are not well-adapted for carrying or pulling the bale 11.

The straps 12–15 may be made of various materials. Preferably, the straps 12–15 are polypropylene strips having two ends that are welded together to secure the straps 12–15 around the bale 11. The straps 12–15 may alternatively be made of twine, nylon, or other similarly strong rope-like material. Those skilled in the art will recognize that the straps 12–15 may be formed from other materials.

Preferably, the bale 11 has four straps 12–15, as illustrated in FIGS. 1–6. The four straps 12–15 are disposed along the exterior of the bale 11 such that they are approximately evenly spaced and substantially parallel to one another. The left-most strap is located near one end of the bale 11, while the right-most strap 15 is located near an opposite end of the bale 11. Of course, those skilled in the art will recognize that fewer or more straps may be provided on the bale 11 and that the straps may be disposed along the bale 11 in a variety of ways. The straps 12–15 illustrated in FIGS. 1–6 are merely exemplary only.

Figure 2:
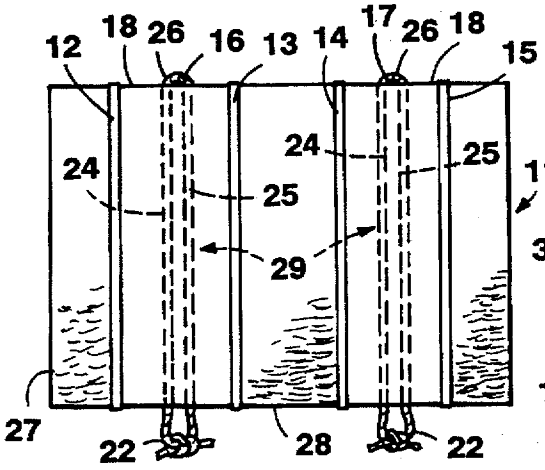
FIG. 2 is a side view of the hay bale of FIG. 1, showing the handles after they are inserted into the bale and before they are grabbed to carry the bale.
Figure 3:
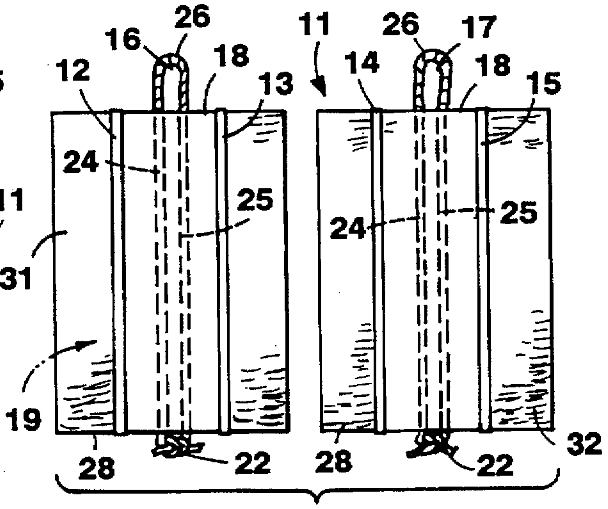
FIG. 3 is another side view of the hay bale of FIG. 1, illustrating how the handles extend from the hay bale after they have been grabbed to carry the bale, and also illustrating how the handles are still intact when the hay bale has been cut in half to reduce its weight and thereby facilitate manual handling of the bale.

In accordance with the present invention, the handles 16, 17 extend from a surface 18 of the hay bale 11 so that a person can easily grab the handles 16, 17. As shown in FIGS. 1–3, the handles 16, 17 are substantially orthogonal to the straps 12–15. Preferably, however, the handles are aligned substantially parallel to the straps 12–15. The handles 16, 17 in the embodiment illustrated in FIG. 1 may be rope, twine, polypropylene, or any suitable material that can be fed or forced into the surface of and/or through the interior region 19 of the bale 11.

As embodied herein and shown in FIG. 1, two handles 16, 17 are provided at convenient locations on the bale 11. Preferably, one of the handles 16 is located between the two left-most straps 12, 13 (as illustrated in FIGS. 1–3), and the other handle 17 is located between the two right-most straps 14, 15 (see FIGS. 1–3). In this manner, the weight borne by each handle 16, 17 is relatively evenly distributed. Of course, in accordance with the present invention, one could grab either handle 16, 17 and carry or pull the bale 11 without severely damaging the bale 11. The two handles 16, 17 are provided for convenience and ease of handling. Thus, for example, if handle 17 were eliminated and handle 16 retained, handle 16 could be located as shown in FIG. 1, or it could be placed between straps 13 and 14. Alternatively, more than two handles may be provided, with a third handle being located, for example, between straps 13 and 14. (See FIG. 4.)

As shown in FIGS. 1–3, preferably the handles 16, 17 form a loop through the bale 11. That is, each "leg" 24, 25 of the handles 16, 17 is inserted into the bale 11 at a different point, with the legs 24, 25 extending through the bale and out another surface 28 of the bale 11 also at different points, as shown in FIGS. 2 and 3. Alternatively, the legs 24, 25 could be fed together (or side-by-side) through the same point on the surface 18 of the bale 11 and also exit the opposing surface 28 of the bale 11 at the same point (or at different points). Together the legs form a coupler 29, disposed within the interior region 19 of the bale 11. At the top end of each handle 16, 17 is an arch 26. The arches 26 form, for example, a continuous loop by which the bale 11 can be carried. At the bottom end of each leg 24, 25 is a knot 22 that secures the free ends of the legs 24, 25 together.

Referring now to FIGS. 2 and 3, the way in which the handles 16, 17 are inserted into the hay bale 11 will be described. As embodied herein, the handles 16, 17 may comprise a single strand of cable, rope, twine, or strap. Each of the two ends of the strand is inserted into the surface 18 of the bale 11 and fed through the bale 11 until the ends protrude from, for example, surface 28 of the bale 11. Surface 28 is opposing the surface 18 into which the ends of the handles 16, 17 are inserted. (Alternatively, the ends could be fed through surface 18 of the bale 11 and exit from an adjacent surface 27 of the bale 11.) The two ends are then joined together to form a knot 22 (if rope, twine, etc.) or are welded together (if polypropylene or similar material), or may be fastened via a fastener. Those skilled in the art will recognize that what is necessary is that the two ends be secured to the opposing surface 28 of the bale 11 so that the ends will not pull through when the handle end 26 is pulled outward from the surface 18 of the bale 11.

Thus, after the handles 16, 17 are inserted into the bale 11 and the ends knotted (if rope or twine), arches 26 lie adjacent surface 18 of the bale 11, and the knot ends 22 extend from the opposing surface 28 of the bale 11, as illustrated in FIG. 2. When a person grabs the arches 26, the arches 26 are pulled upward and away from the surface 18 of the bale 11, and the knot ends 22 are pulled upward toward the opposing surface 28 of the bale 11, as illustrated in FIG. 3. The arches 26 thereby form loops that can be grabbed by the person to carry or pull the bale 11.

As illustrated in FIG. 3, the bale 11 can be cut into two pieces 31, 32, with piece 31 having handle 16, and piece 32 having handle 17. Compressed and field hay bales are often cut into halves to make them lighter, less bulky, and thus easier to carry and handle. As embodied herein, the bale 11 can be cut into halves 31, 32 between, e.g., straps 13, 14, and each of the halves 31, 32 of the bale 11 will still have a handle.

Figure 4:
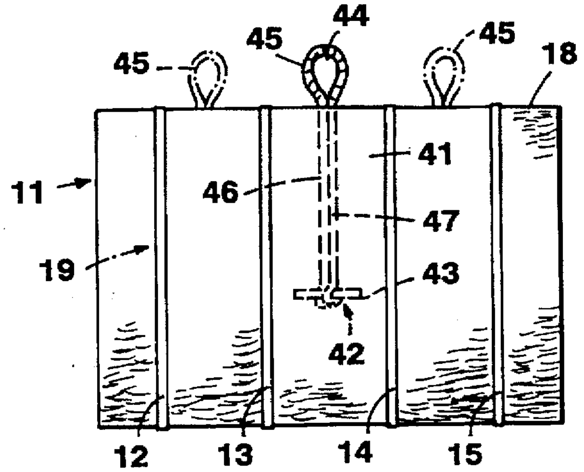
FIG. 4 is a side view of a hay bale illustrating another embodiment of the carrying handles of the present invention.

Referring now to FIG. 4, a second embodiment of the apparatus in accordance with the present invention will be described. This second embodiment includes a handle 45, a coupler 41, and a stopper 42. The handle 45 extends from the surface 18 of the hay bale 11. The coupler 41 extends from the handle 45 and into the interior region 19 of the bale 11. At the end of the coupler 41 is the stopper 42, which may have a dowel 43 or other similar element affixed to the stopper 42. As embodied herein, the handle 45, coupler 41, and stopper 42 are integral, preferably a single piece of rope, twine, or similar material. As shown in FIG. 4, the stopper 42 may be a knot with the dowel 43 secured to the knot. In this way, the stopper 42 is securely held within the interior region 19 of the bale 11.

As embodied herein, the handle 45 comprises a loop 44 extending from the surface 18 of the bale 11. As shown in FIG. 4, the coupler 41 may comprise the two ends 46, 47 of rope or twine inserted side-by-side into the bale 11, with the stopper 42 imbedded somewhere well within the interior region 19 of the bale 11 to prevent it from being pulled out of the bale 11 when the handle 45 is pulled upward. Alternatively, the two ends 46, 47 may be inserted into the bale 11 in a manner similar to the handles 16, 17 shown in FIGS. 1–3, with the ends 46, 47 spaced apart within the bale 11. Furthermore, the coupler 41 may comprise a single strand of rope, twine, or other material, with a handle mechanism (not shown) affixed to the end of the coupler 41 extending from the surface 18, and with a knot formed in the stopper end 42 of the coupler 41. Again, a dowel 43 or similar device may be employed to further secure the stopper 42 within the bale 11.

In the embodiment of FIG. 4, the handle unit may be incorporated into the bale 11 during the process of forming the bale. Thus, if the bale is a high-density compressed hay bale, during formation of the bale 11 in the machinery, the handle unit (i.e., handle 45, coupler 41, and stopper 42) is placed within the hay being compressed and the bale is formed around the unit. When the compressed bale 11 is completed, the handle end 45 will extend from the bale 11, and the straps 12–15 can be secured around the bale 11. If the bale is a field bale, the handle unit can be inserted into the hay while it is being passed through the chute on the field baling machine.

Figure 5:
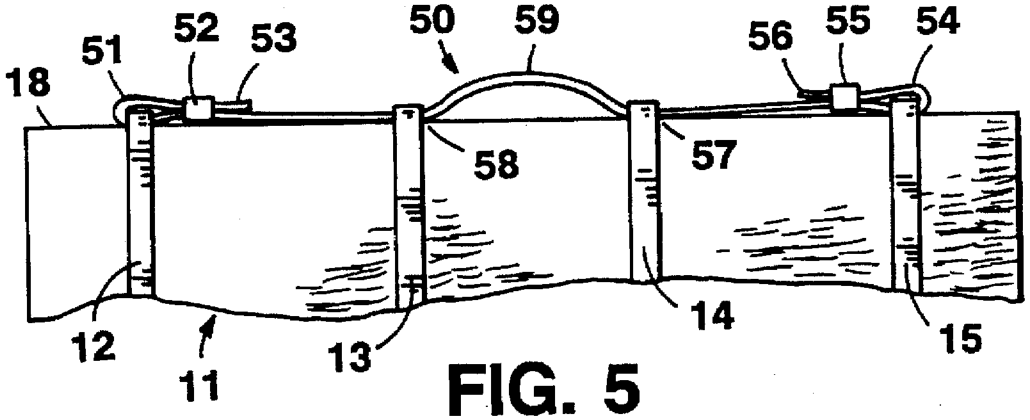
FIG. 5 is a partial side view of a hay bale illustrating another embodiment of the carrying handle of the present invention, in which the handle is secured to the straps that surround the hay bale.

FIG. 5 illustrates yet another embodiment in accordance with the present invention. As embodied herein, in this embodiment, the bale 11 is surrounded by straps 12–15, and a handle unit 50 for carrying the bale 11 is secured substantially or thoroughly to the straps 12–15. The handle unit 50 comprises a grab loop 59, a first loop 51 surrounding strap 12, a first portion 58 passed under strap 13, a second portion 57 passed under strap 14, and a second loop 54 surrounding strap 15. Thus, the first portion 58 of the handle unit 50 lies between strap 13 and surface 18 of the bale 11, and the second portion 57 of the handle unit 50 lies between strap 14 and surface 18. The grab loop 59 extends from surface 18 of the bale 11, forming a space or loop between the surface 18 and the grab loop 59 in which a person can fit his hand (or some lifting tool) to grab and carry or pull the bale 11. A first end 53 of the unit 50 is fed under strap 13 and is looped around strap 12, forming first loop 51, and a first fastener 52 secures the first end 53 such that the first loop 51 is secured to strap 12. A second end 56 of the unit 50 is fed under strap 14 and is looped around strap 15, forming second loop 54, and a second fastener 55 secures the second end 56 such that the second loop 54 is secured to strap 15.

When the handle unit 50 is pulled at the grab loop 59 to lift the bale 11, the configuration of the unit 50 prevents it from being pulled free from the bale 11. When the grab loop 59 is pulled, both loops 51, 54 remain affixed around straps 12 and 15, respectively, which straps (together with the fasteners 52, 55) prevent the ends 53, 56 from pulling free of the bale 11. Because portions 57, 58 are fed under straps 13, 14, grab loop 59 remains intact when the bale 11 is pulled or lifted by the handle 59.

The handle unit 50 may be formed from a polypropylene strap or may be twine, rope, or other suitable material. Fasteners 52, 55 for securing such a strap or rope or twine are well-known to those skilled in the art. If polypropylene, the fasteners 52, 55 may comprise a weld or metallic or plastic fastener. If rope or twine, the fasteners 52, 55 may comprise a metallic or plastic fastener or other suitable fastener. The bale 11 may be supplied with one or more of the handle carrying units 50 disposed along the straps 12–15. If more than one carrying handle unit 50 is supplied, the weight of the bale 11 may be distributed more evenly across each of the various units.

Figure 6:
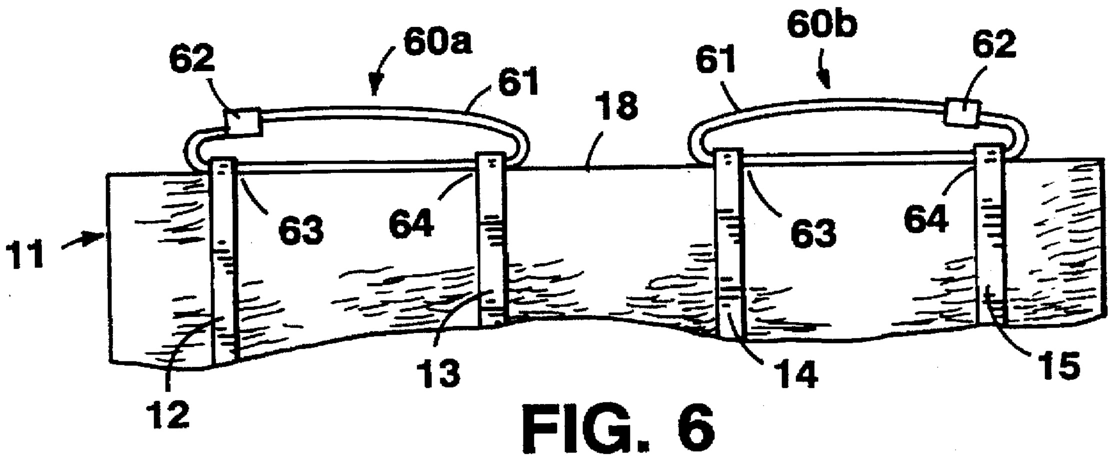
FIG. 6 is a partial side view of a hay bale illustrating yet another embodiment of the carrying handles of the present invention, in which the handles are secured to the straps that surround the hay bale, these handles remaining intact even when the bale is severed into halves.

FIG. 6 illustrates another embodiment in accordance with the present invention. Here, handle units **60*a*, 60*b* are provided, which each have a grab loop 61, a fastener 62 for securing the ends of the grab loop together, and portions 63, 64 that pass under the straps 12–15. The grab loops 61 extend from the surface 18 of the bale 11 and form a loop secured to the bale 11 by two of the four straps 12–15. As with the embodiment illustrated in FIG. 5, these handle units 60*a*, 60*b* may comprise a polypropylene strap, rope, twine, or other suitable material. Those skilled in the art will recognize that several or just one such handle unit 60*a*, 60*b* may be supplied on each bale 11, that the handle(s) units 60*a*, 60*b* may be located at varying positions on the bale 11, and that the handle(s) units 60*a*, 60*b* may be looped around one or all of the straps 12–15. The fasteners 62 may be like those described above for the embodiment shown in FIG. 5**.

Figure 7:
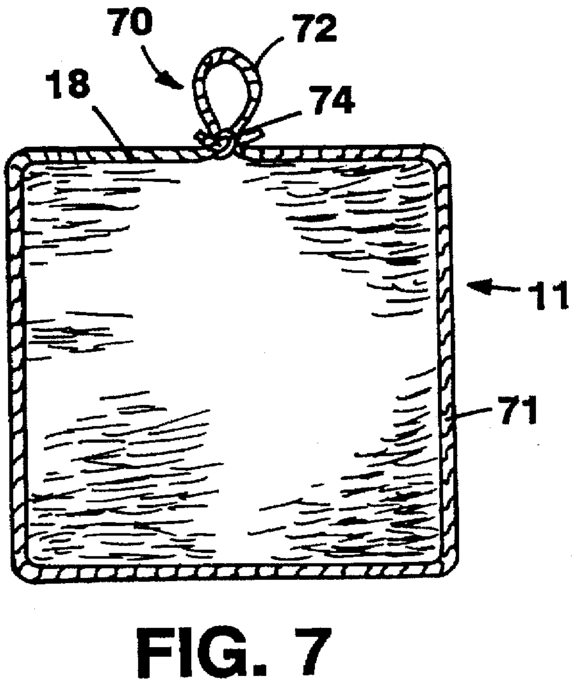
FIG. 7 is a side view of a hay bale illustrating yet another embodiment of the carrying handles of the present invention, in which the handle is formed from a strap surrounding the hay bale.

FIG. 7 illustrates a handle unit 70 that is integral to the strap 71 surrounding the bale 11. As embodied herein, the strap 71 is a twine or rope material, and the handle unit 70 includes a handle 72 extending from surface 18 of the bale 11, and includes a knot 74. The knot 74 may be replaced by a fastener located where the knot 74 is shown, the fastener that secures the handle 72 into a loop, like the loop of handle 72 illustrated in FIG. 7. Again, like the embodiments described above, one or more handle units 70 may be provided on each bale 11.

It will be apparent to those skilled in the art that various modifications and variations can be made in the apparatus and method of the present invention without departing from the spirit or scope of the invention. Thus, it is intended that the present invention cover the modifications and variations of this invention, provided they come within the scope of the appended claims and their equivalents.

What is claimed is:

1. A hay bale that can be carried, comprising:

a. a high-density compressed hay bale that is difficult to penetrate with a manual hay bale carrying apparatus, the high-density compressed hay bale having an interior region and a first exterior surface; and b. a first essentially permanent carrying device, secured within a substantially solid portion of the interior region of the high-density compressed hay bale and extending from the first exterior surface of the high-density compressed hay bale, for carrying said high-density compressed hay bale, said first essentially permanent carrying device remaining secured within the interior region of the high-density compressed hay bale when a force is applied to the first essentially permanent carrying device at essentially any angle relative to the first exterior surface, the first essentially permanent carrying device including:

(1) a first handle extending from said first exterior surface of said high-density compressed hay bale, (2) a first coupler disposed within said interior region of said high-density compressed hay bale, said first coupler having a handle end and a stopper end, said first handle being located at said handle end of said first coupler, and (3) a first stopper, located at said stopper end of said first coupler, for securing said first coupler within said interior region of said high-density compressed hay bale.

2. The hay bale recited in claim 1 wherein the first handle and the first coupler are integral.

3. The hay bale recited in claim 2 wherein the first handle and the first coupler comprise a twine material.

4. The hay bale recited in claim 1 wherein the first stopper comprises a dowel.

5. The hay bale recited in claim 1 wherein the first handle, the first coupler, and the first stopper are integral, the first stopper comprising a knot.

6. The hay bale recited in claim 1 wherein the first stopper is disposed within the interior region of the high-density compressed hay bale.

7. The hay bale recited in claim 1 wherein the high-density compressed hay bale has a second exterior surface, the first coupler extending from the first exterior surface to said second exterior surface, the first stopper being disposed outside the interior region and adjacent the second exterior surface of the high-density compressed hay bale.

8. The hay bale recited in claim 7 wherein the second exterior surface opposes the first exterior surface of the high-density compressed hay bale.

9. The hay bale recited in claim 1, further comprising:

a. a second essentially permanent carrying device, secured within the interior region of the high-density compressed hay bale and extending from the first exterior surface of the high-density compressed hay bale, for carrying said high-density compressed hay bale, said second essentially permanent carrying device remaining secured within the interior region of the high-density compressed hay bale when a force is applied to the second essentially permanent carrying device at essentially any angle with respect to the first exterior surface, the second essentially permanent carrying device including:

(1) a second handle extending from said exterior surface of said high-density compressed hay bale, (2) a second coupler disposed within said interior region of said high-density compressed hay bale, said second coupler having a handle end and a stopper end, said second handle being located at said handle end of said second coupler, and (3) a second stopper, coupled to said stopper end of said second coupler, for securing said second coupler within said interior region of said high-density compressed hay bale.

10. The hay bale recited in claim 9 wherein the high-density compressed hay bale has a first half and a second half, wherein the first essentially permanent carrying device is located at said first half; and wherein the second essentially permanent carrying device is located at said second half.

11. The hay bale recited in claim 1 wherein the first handle forms an arch extending from the first exterior surface, said arch having a first arch end and a second arch end, said first and second arch ends being located at the first exterior surface; wherein the first coupler comprises a first leg joined to said first arch end and a second leg joined to said second arch end; and wherein a free end of said first leg and a free end of said second leg extend through the interior region and extend from a second exterior surface of the high-density compressed hay bale, said second exterior surface opposing the first exterior surface, said free end of said first leg and said free end of said second leg being coupled to one another.

12. The hay bale recited in claim 11 wherein the first leg and the second leg penetrate the first exterior surface at different points on the first exterior surface and are separated from each other within said interior region.

13. The hay bale recited in claim 12 wherein the free end of the first leg and the free end of the second leg are coupled via a knot, whereby said knot abuts the second exterior surface when the first handle is pulled away from the first exterior surface.

14. A hay bale that can be carried, comprising:

a. a substantially solid compressed hay bale having an interior region and a first exterior surface; and b. a first essentially permanent carrying device, secured within a substantially solid portion of the interior region of the compressed hay bale and extending from the first exterior surface of the compressed hay bale, for carrying said compressed hay bale, the first essentially permanent carrying device including:

(1) a first handle extending from said first exterior surface of said compressed hay bale, (2) a first coupler disposed within said interior region of said compressed hay bale, said first coupler having a handle end and a stopper end, said first handle being located at said handle end of said first coupler, and (3) a first stopper, located at said stopper end of said first coupler, for essentially permanently securing said first coupler within said interior region of said compressed hay bale.

15. The hay bale recited in claim 14 wherein the first stopper is disposed within the interior region of the compressed hay bale.

16. The hay bale recited in claim 14 wherein the compressed hay bale has a second exterior surface, the first coupler extending from the first exterior surface to said second exterior surface, the first stopper being disposed outside the interior region and adjacent the second exterior surface of the compressed hay bale.

17. The hay bale recited in claim 14, further comprising:

a. a second essentially permanent carrying device, secured within a substantially solid portion of the interior region of the compressed hay bale and extending from the first exterior surface of the compressed hay bale, for carrying said compressed hay bale unit, the second essentially permanent carrying device including:

(1) a second handle extending from said exterior surface of said compressed hay bale, (2) a second coupler disposed within said interior region of said compressed hay bale, said second coupler having a handle end and a stopper end, said second handle being located at said handle end of said second coupler, and (3) a second stopper, coupled to said stopper end of said second coupler, for essentially permanently securing said second coupler within said interior region of said compressed hay bale.

18. The hay bale recited in claim 17 wherein the compressed hay bale has a first half and a second half; wherein the first essentially permanent carrying device is located at said first half; and wherein the second essentially permanent carrying device is located at said second half.

19. The hay bale recited in claim 14 wherein the first handle forms an arch extending from the first exterior surface, said arch having a first arch end and a second arch end, said first and second arch ends being located at the first exterior surface; wherein the coupler comprises a first leg joined to said first arch end and a second leg joined to said second arch end; and wherein a free end of said first leg and a free end of said second leg extend through the interior region and extend from a second exterior surface of the compressed hay bale, said free end of said first leg and said free end of said second leg being coupled to one another.

20. A method for securing an essentially permanent carrying device to a compressed hay bale, the compressed hay bale having an interior region and a first surface and a second surface, the method comprising the steps of:

a. inserting a first end of a coupler into the first surface of the compressed hay bale, through a substantially solid portion of the interior region, and out of the second surface, such that the first end extends beyond the second surface, the coupler also having a second end, such that at least a portion of the essentially permanent carrying device extends from the first surface of the compressed hay bale, the extending portion of the essentially permanent carrying device being located at the second end of the coupler; and b. securing at least a portion of the coupler within the substantially solid portion of the interior region of the compressed hay bale.

21. The method recited in claim 20 wherein the coupler has a first leg and a second leg, the inserting step further comprising the substep of inserting both the first leg and the second leg into the first surface and through the substantially solid portion of the interior region of the compressed hay bale such that the first ends of the first and second legs extend beyond the second surface of the compressed hay bale, and the securing step further comprising the substep of securing the first ends of the first and second legs to one another.

22. The method recited in claim 20 wherein the coupler is secured within the interior region by a stopper located at the first end of the coupler.

23. A process for producing a hay bale that can be carried, the process comprising the steps of:

a. providing a high-density compressed hay bale that is difficult to penetrate with a manual hay bale carrying apparatus, the high-density compressed hay bale having an interior region and a first exterior surface;

b. essentially permanently securing a carrying device within a substantially solid portion of the interior region of the high-density compressed hay bale; and c. extending a portion of the carrying device from the first exterior surface of the high-density compressed hay bale, such that the high-density compressed hay bale can be carried using the extending portion of the carrying device, the carrying device remaining secured within the interior region of the high-density compressed hay bale when a force is applied to the first essentially permanent carrying device at essentially any angle relative to the first exterior surface.

24. An apparatus for carrying a compressed hay bale, prepared by a process comprising the steps of:

a. compressing hay to form a substantially solid compressed hay bale having an interior region and a first exterior surface, the substantially solid compressed hay bale being difficult to penetrate with a manual hay carrying apparatus;

b. inserting a coupler through the exterior surface of the substantially solid compressed hay bale and into the interior region of the substantially solid compressed hay bale;

c. locating a handle at an end of the coupler, such that at least a portion of the handle extends from the exterior surface of the compressed hay bale; and d. essentially permanently securing at least a portion of the coupler within the interior region of the compressed hay bale.

25. The apparatus recited in claim 24 wherein the coupler is secured within the interior region by a stopper.

26. A hay bale that can be carried, comprising:

a. a substantially solid compressed hay bale having an interior region and an exterior surface;

b. a handle extending from the exterior surface of the substantially solid compressed hay bale for carrying the substantially solid compressed hay bale;

c. a coupler disposed within the interior region of the substantially solid compressed hay bale by mechanically inserting the coupler through the exterior surface and into the interior region of the substantially solid compressed hay bale, the coupler having a handle end and a stopper end, the handle being located at the handle end of the coupler; and d. a stopper, located at the stopper end of the coupler, for essentially permanently securing the coupler within the interior region of the substantially solid compressed hay bale.

* * * * *